May 23, 1944.　　　　R. L. SMITH　　　　2,349,384
POSTING AND CHECK REGISTER
Filed Oct. 15, 1941　　　　2 Sheets-Sheet 1
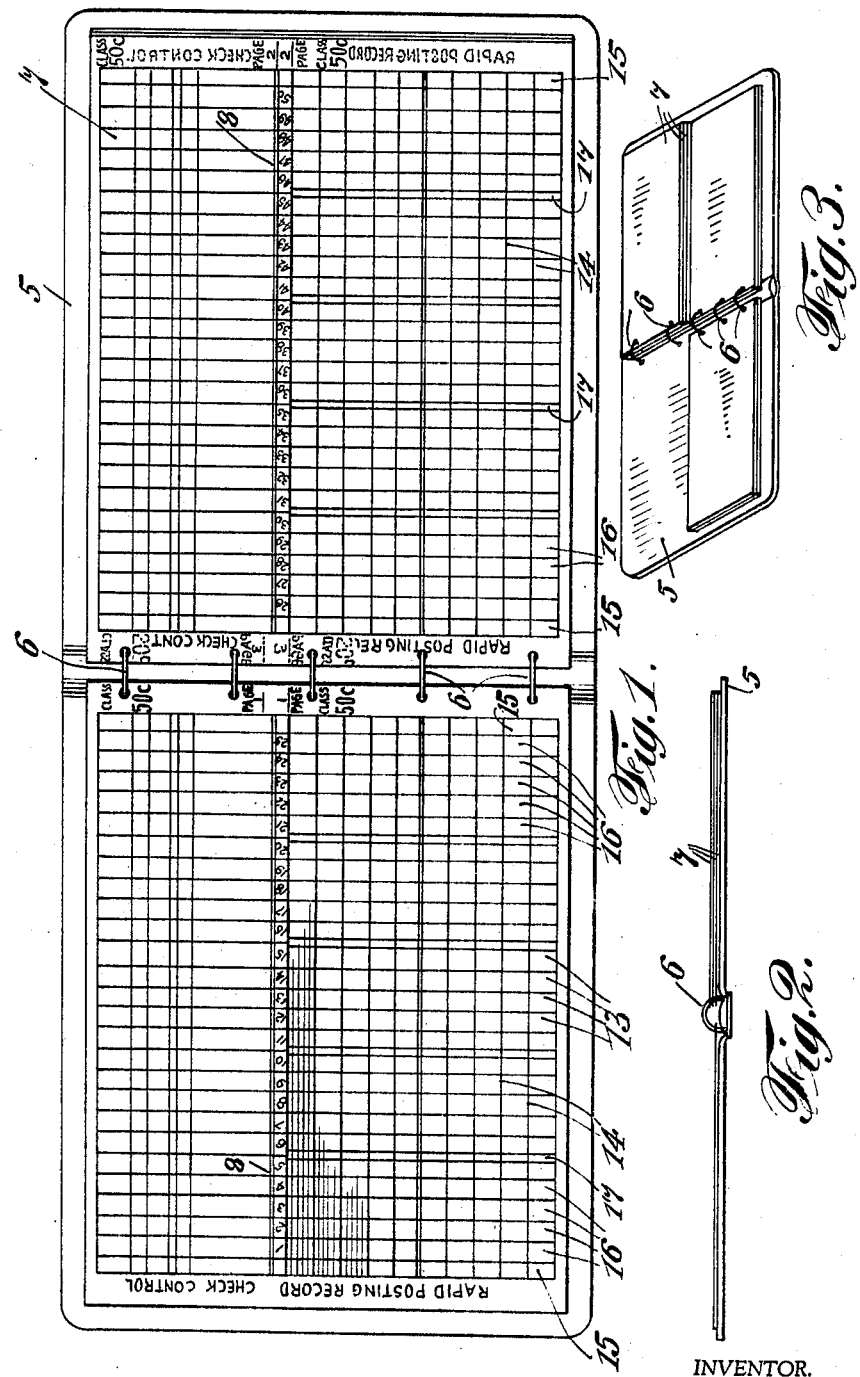
INVENTOR.
Robert L. Smith
BY
Ramsey, Kent, Chisholm and Leety
his ATTORNEYS May 23, 1944.  R. L. SMITH  2,349,384

POSTING AND CHECK REGISTER

Filed Oct. 15, 1941  2 Sheets-Sheet 2

INVENTOR.
Robert L. Smith
BY Ramsey, Kent, Chisholm and Lutz
his ATTORNEYS

Fig. 4

Patented May 23, 1944

2,349,384

UNITED STATES PATENT OFFICE 2,349,384

POSTING AND CHECK REGISTER

Robert Lape Smith, Little Falls, N. J.

Application October 15, 1941, Serial No. 414,990

5 Claims. (Cl. 283—66)

This invention relates to bookkeeping systems, such as may be used by a bank, for example, in keeping its records of installment payments or deposits, for so-called Christmas Clubs or the like. Ordinarily in a plan of this kind the customer (depositor) undertakes to make a payment each week, beginning at a certain date, of a particular amount, say, $1.00, over a period of fifty weeks. At the end of the fifty-week period the depositary determines from its records how much the depositor had paid in, and issues a check for the amount in favor of the depositor. The scheme is simple enough in principle, as are all installment payment plans, but there are practical problems involved in the keeping of the necessary records, so that both depositor and depositary may be protected, and so that the handling of a multitude of similar accounts and transactions may involve the minimum of expense to the depositary for clerical help, stationary and equipment.

An account such as has been referred to may be begun by the filling in of a signature card by the depositor. This may carry, in addition to his authentic signature, such particulars as the depositary may deem important for the purposes of the transaction, e. g., the class of account (that is, whether the weekly payment is to be $1.00, or $2.00, etc.), the number or other identifying indicium allotted to the particular account, depositary's address, whether the weekly payment is to be charged against the customer's regular bank account, etc., etc. At the same time there may be issued to the depositor a coupon-book comprising, say, fifty coupons detachable from corresponding stubs, coupons and stubs alike carrying the number that has been assigned to the depositor, and being additionally consecutively numbered from 1 to 50. Such a coupon-book may also have the coupons dated consecutively, for example, December 4, 1939, December 11, 1939, December 18, 1939 . . . November 11, 1940; and the stubs (assuming the payments are in the $1.00 class) may carry consecutive legends, e. g., Total amount paid $1.00, Total amount paid $2.00 . . . Total amount paid $50.00. As each payment is made or credited the depositary applies an appropriate "Received payment" stamp, with date of receipt, to the appropriate coupons and corresponding stubs. Where payments are made in person the coupon-book is presented to the depositary with the payments. The depositary, after stamping the appropriate coupons and stubs as aforesaid, detaches the coupon relating to the particular payment and returns the book to the depositor, the detached coupons being retained by the depositary for posting in such ledger or other account book as may be devoted to that purpose; in some cases, indeed, the posting is done on the original signature card.

It is with the bookkeeping operations of the depositary, other than the initial filling out of the signature card and the actual handling of coupon-book and coupons, that my invention is concerned. It is embodied in and related to what I term and have shown and shall describe as a combined rapid posting record, and check control. The objects and aims of the invention have been suggested broadly, and will appear in more detail as the description proceeds.

In the accompanying drawings, in which I have shown, for purposes of illustration, an embodiment and utilization of the invention as applied to the particular conditions of Christmas Club or the like installment payments:

Fig. 1 is a plan view of an account book in which are assembled on the loose-leaf principle single sheets, two of which are presented to view, each revealing on the face thereof, respectively, that is exposed in the figure, the combined posting record and check control sections hereinafter described;

Fig. 2 is an edge view of the same;

Fig. 3 shows in perspective an embodiment of the same combined posting record and check control sections, except that these are on separated, but matching sheets—matching in the sense that together they are the equivalent, except for the fact that they are not physically integral, of the several sheets exhibited in Fig. 1; and Fig. 4 is a plan view showing one face of each of the two disjunct but matching sheet-sections that go to make up the combined posting record and check control sheet corresponding in numbering, etc. to the right-hand sheet of Fig. 1, but as looking at the other side of that sheet from what is shown in Fig. 1.

Referring to the numerals on the drawings, and first particularly to Fig. 1, the numeral 5 indicates the covers of an ordinary loose-leaf binder, the rings 6 whereof may be manipulated to engage appropriately spaced and located apertures in the margins of leaves or sheets 7, of paper or other suitable material, to hold the same in book-relation as shown, and to permit of the removal of individual sheets when desired. Each sheet 7 is adapted for a particular class of payments, in this case indicated as fifty cents per week, the indicium "50¢" appearing twice on the right-hand vertical margin of the face of each of the two sheets as these faces are exhibited in Fig. 1, once on the "Rapid posting record" section of a sheet, and once on the corresponding "Check control" section thereof. Each sheet has also page indicia on those margins, the legend "Page 1" appearing twice on the left-hand page of Fig. 1, and the legend "Page 2" appearing twice on the right-hand page of Fig. 1, once on the "Rapid posting record" section and once on the "Check control" section in each case. The consecutive numbering of pages is followed in all the sheets that may be included in the group allotted to and identified with the "50¢" class of depositors. Thus the right-hand sheet appearing on Fig. 1 will carry on its other face the legends "Page 3" and the indicia "50¢" on what will be the right-hand margin of the sheet when the sheet is turned on the rings 6 and lies flat on the left-hand sheet of Fig. 1. (See dotted lines in Figs. 1 and 4.) And similarly, succeeding sheets (as to both sections thereof respectively except, preferably, the hidden face of the first sheet of the book as it appears in Fig. 1) will have their opposite faces in consecutively numbered relation to each other and to their neighbors, and both sections of every page will be marked as to class.

Each face of each sheet (excepting again the first sheet of the book) is thus a regularly numbered page of the book, and each page is in two sections, one above the other on the hinge-line about which the leaves turn as the book is opened flat to reveal any two adjacent faces of two adjacent leaves. With the arrangement shown, the hidden face of the first multiple sheet of the book (Fig. 1), which for distinction I will call the obverse face, will not carry a page number or other markings as does its other or reverse face; and the last sheet of the book will have a page number etc., on its obverse, but not on its reverse, face. Since it is usual practice, when the complement of pages of a book approach the point of saturation, to start a new book, beginning with the unfilled sheets of the old, and continuous therewith as to numbering of pages, it is easy to keep in service a book that always, when opened flat, reveals double the number of accounts that appear on a single page.

Each sheet 7 and each face thereof is divided into two parts by relatively superposed printed horizontal lines 8 that run across the sheet, and along which the sheet may be severed if desired, as hereinafter described. The part of the sheet that is above line 8 is the check control section of the sheet and carries on its left-hand margin (as to each face of the sheet when the sheet is viewed in reading) the legend "Check control"; and each part of the sheet that is below line 8 is the posting record section of the sheet and carries on its left-hand margin (as to each face of the sheet when the sheet is viewed in reading) the legend "Rapid posting record." When I describe markings on the sheet or the parts of the sheet I have in mind the fact that each face of the sheet (with the exception previously noted) is similarly marked, allowing for the inversions made necessary by the turning of the sheet on the rings 6 in use, and except for difference in page numbers and in the numbering of columns 13 hereinafter described.

The sheet, or rather page, markings other than those already specified are shown in detail in Fig. 4. Thus, on the "Check control" part of the sheet there is a succession of spaced vertical lines 9, intersected by horizontal lines 10, whereby the "Check control" section is divided into vertical space-columns 11 that reach from one horizontal edge portion to the other of the "Check control" section and are disposed in side-by-side relation from the left-hand margin to the right-hand margin of the section, each subdivided into space-blocks identified by legends appearing in the first of said space-blocks at the left-hand margin as follows: "Name and address"—"Amount"—"Check No."—"Check paid"—"Remarks"; and "Total" in the lower one of said space-blocks, at the right, all of these legends etc. being disposed to be read at right angles to horizontal line 8.

The "Rapid posting record" section of the sheet, which is relatively of considerable dimension from its upper horizontal edge 8 to its lower horizontal edge 8', as compared with the corresponding dimension of the "check control" section is provided with vertical lines 12 which are extensions of or (in case the two parts of the sheet are severed, as in Fig. 4) adapted to be vertically alined with the vertical lines 9. Lines 12 divide the "Rapid posting record" section into vertical space-columns 13 that extend in side-by-side relation from the left-hand margin of the section to the right-hand margin thereof, and headed "Weekly totals"—1—2—3 . . . etc. up to 25 or whatever is the appropriate number of vertical columns corresponding to the vertical columns 11 of the "Check control" section, with the last column on the right, headed by the legend "Weekly totals" in alinement with the space-columns marked "Total" in the "Check control" section.

Each vertical space-column 13 of the "Rapid posting record" is broken up by suitable intersecting horizontal lines 14 into fifty rectangular space-blocks running from top to bottom. The space-blocks 15 thus defined in the extreme left- and right-hand columns legended "Weekly totals" are marked with consecutive amounts—.50—1.00—1.50—etc., running from the top to a final 25.00 at the bottom and reading parallel to line 8, the spaces 16 thus defined in the columns headed 1 to 75 are to receive indicia made at or about the time of dates of payments made by the depositor; and below (or in the case of physically separated check control and posting sections, adapted to be alined with) each of the lines 12 respectively located between the fifth and sixth, the tenth and eleventh, the fifteenth and sixteenth and the twentieth and tweny-first of the columns headed 1-25, (taking the left-hand sheet of Fig. 1 for example), there is a very narrow space-column 17 running from top to bottom of the section and broken up by the horizontal lines 14 to provide spaces horizontally alined with space-blocks 15 and 16, and numbered 1–50 from top to bottom, reading parallel to line 8.

Although I have shown in the space-blocks legended "Check No." in the "Check control" section the same numbers, 51–75, as appear at the head of the alined space-columns legended 51–75 on the complementary "Rapid posting record" section, this is not essential. The customer's number, 1–25, 26–50, 51–75, or whatever it may be, is on the "Rapid posting record," so that even though the sections are physically separate, as in Figs. 3 and 4, the proper one of such sections to receive the posting of a particular customer's payment is readily found. And in case for any reason it becomes necessary or desirable to match or bring as into the Fig. 4 relation, the complementary "Rapid posting record" and "Check control" of any particular sectional sheet, this is readily accomplished because of the identical page marking of matching faces of such complementary sections; of course complementary sections will be so disposed in the book that matching faces may be presented to view at the same time and in proper matching relation and with customers' numbers on the posting record section in consecutive arrangement as between one section and the next in the series or group.

As stated, the sections may be initially in one piece, to be separated if desired at any time by cutting along the line 8; or they may be initially separate. I prefer the latter arrangement, because it is the "Rapid posting record" section that is used regularly and frequently; the "Check control" is normally used only at the time an account is opened and at the end of the fifty-week period. And at the end of that period the "Check control" section of a particular pagination, having had the payment totals for all of the customers noted thereon as to both faces of the sheet section, may be removed from the rings and handed to the clerk who makes out the payment checks, etc. Further, it is sometimes thought desirable to have record transactions thus separable, so that different clerks may handle different parts of the recording, thereby imposing a check such as is impossible where one person does everything. And it is advantageous too because it is easier to handle the relatively narrow "Check control" section by itself (by "narrow" I mean as regards its dimensions from top edge to bottom edge in the drawings), having regard especially to the carriage width of tabulating machines. As a matter of fact a typical "Check control" section can be handled on an ordinary typewriter—a sheet embodying both sections could not be. And in this connection it should be noted that in the combined sections, as they appear whether integral or severed but matching, the numbering and text on the "Check control" section reads at right angles to those on the matching posting section, except for the class identifying indicia ("50¢") and page numbers. The advantage of this arrangement is obvious, where the two sections are initially severed or severed prior to making out check records at the end of the fifty-week period.

I have called the posting section the "Rapid posting record" because, in the first place, of the speed with which entries can be made on it. The section takes care of a considerable number of accounts (fifty are presented to the eye of the clerk when he opens the book as in the illustration), but by reason of the "Weekly totals" columns and the intermediate numbered columns 17 the total number of accounts is broken up into groups of five, each group bordered vertically by two columns that, by reason of their indicia, will facilitate the work of the clerk when for example a customer makes a single payment to cover a plurality of delayed payments or advance payments; obviously, no matter where in the horizontal and vertical aspects of the section the particular entry for the particular customer is to be made, the clerk's eye and hand are as it were automatically guided and restrained in and by the visually distinct grouping of the vertical space-columns 13. Important also is the fact that each of the customers' numbers (being the numbers 51–75, for example, shown in Fig. 4) is printed respectively at an angle of say 45° to the line along which those numbers extend sequentially. This breaking of the continuity between numbers prevents any likelihood of, as it were, visually coupling the end of one number with the end of an adjacent number, which might make for hesitation and loss of time or even error on the part of the clerk or teller as his eyes scan the sheet, items that must be taken into consideration in banks or the like.

In the second place, because of the book arrangement, and because I utilize both faces of each sheet, and because of the predetermined consecutive numbering of the columns 13 on the sheets and from sheet to following sheet, and on page after page, I am able to expose to view at one time the posting columns for (in the drawing Fig. 1) as many as fifty customers in sequence from left to right. And when the right-hand sheet of Fig. 1 (or the right-hand posting record section, if this be severed from its matching "Check control" section), is turned to lie flat on the left-hand sheet of Fig. 1 (or the left-hand posting record section, if this be severed from its matching "Check control" section), there will be presented to view the posting columns for customers numbered 51–100; and so on.

It is contemplated that for small institutions one book may contain several assemblies of the combined "Check control" and "Rapid posting record" sheets (sheets, of course, means either the one-piece sheet of Fig. 1, or the two-piece arrangement of Fig. 4), each assembly covering a particular class, as $1.00, $2.00, etc. The sheets for particular classes will of course be identified by their appropriate identifying mark, as already described, and in addition I may use for each assembly a color different from that of every other group in the book, this differentiation by color being accomplished, for example, by placing ahead of each group an index sheet of a particular color appropriate to that group. Thus, ahead of the 25¢ group we might have a blue index sheet, ahead of the 50¢ group a red index sheet, and so on. In practice the coupon-books supplied to the customers may have covers colored to correspond with these index sheets.

In cases where a number of different classes of accounts are provided for in a single book, it is sometimes preferred to have the numbering of the pages run consecutively, beginning with the first class and through the others; for example, we may suppose that we begin with the 25¢ class and run from 1 to 250. Then comes the 50¢ class, of which the pages will be numbered from 251 to 500; and so on.

Obviously the various space-blocks, 15, 16, etc., illustrated as formed by the intersection of straight and continuous vertical and horizontal lines, and therefore as being rectangular, might be otherwise (and equivalently for the purposes of my invention) constituted and shaped. Thus a particular vertical column or horizontal row of spaces may comprise a succession of spaces that are circular or elliptical or irregular, it being necessary only that there be enough in the way of outlining or framing to make clear the columnar or row arrangement and the sequence of visually distinct spaces in such columns or rows.

It is to be understood that the invention is capable of embodiment and modification beyond what is illustrated, in view of which such limitations as are to be imposed are only those set forth in the following claims.

I claim:

1. In a loose-leaf account book, a series of multiple sheets each comprising a rectangular posting section leaf turning on the lower part of the length of the hinge-line of the book and a separate rectangular control section leaf turning on the upper part of the length of the hinge-line of the book independently of the turning of the posting section leaf of that sheet, each leaf being freely removable from and replaceable in the book, each face of each section of each sheet matching a corresponding face of the other section of that sheet, corresponding faces of each section of a particular sheet carrying pagination indicia allocated and common and peculiar to those two faces of the sections of that particular multiple sheet, the indicia being such as to show sequence relation as between the two sides or faces of each multiple sheet and as between each sheet and its neighbor and to make possible the ready matching of a particular face of one section of a particular multiple sheet with the corresponding face of the other section of that sheet; the faces of each section of a multiple sheet being divided into registering vertical columns, columns in the posting section carrying customers' numbers in sequence (one for each such column) and in horizontal alignment across said column; all of said registering columns of both sections being cut by a multiplicity of spaced horizontal lines, and the spaces in the column at the left-hand vertical margin of the control section carrying indicia printed to be read in a line parallel to the vertical margin of that section and referring to the names and addresses and other particulars about customers and their accounts, with succeeding vertical columns registrable with corresponding columns of the corresponding posting section page; all substantially as and for the purposes set forth.

2. The combination set forth in claim 1, in which the vertical columns nearest the vertical margins of the posting section leaf carry numbers increasing progressively from top to bottom signifying accumulating period totals.

3. The combination set forth in claim 1, in which main vertical columns of the posting section leaf are divided into groups by a narrow column carrying numbers in sequence to identify successive vertical spaces in the main vertical columns.

4. The combination set forth in claim 1, in which the said customers' numbers at the tops of vertical columns of the posting section leaf are obliquely disposed.

5. A device for the bookkeeping of a multiplicity of similarly-characterized individual customer's accounts, comprising a bi-partile sheet having a rectangular posting section leaf constituting the lower part of the sheet and a rectangular control section leaf constituting the upper part of the sheet, the said section leaves being separable and re-associable with each other along a common line for individual or conjoint reference respectively, the face of the posting section of said sheet matching the corresponding face of the control section of said sheet, the corresponding faces thereof each carrying sheet-identifying indicia allocated and common and peculiar to the pair of faces of the bi-partile sheet, said faces of each section of the sheet being divided into vertical columns which are in registry when the leaves are associated along their common line, columns in the posting section carrying customers numbers in sequence (one for each column) and in horizontal alinement across said columns; all of said registering columns of both sections being cut by a multiplicity of spaced horizontal lines, and the spaces in the column at the left-hand vertical margin of the control section carrying indicia printed to be read in a line parallel to the vertical margin of that section and referring to the names and addresses and other particulars about customers and their accounts, with succeeding vertical columns registrable with corresponding columns of the corresponding record section page; all substantially as and for the purposes set forth.

ROBERT LAPE SMITH.